US010877489B2

(12) United States Patent
Durand et al.

(10) Patent No.: US 10,877,489 B2
(45) Date of Patent: Dec. 29, 2020

(54) IMAGING SEEKER FOR A SPIN-STABILIZED PROJECTILE

(71) Applicant: Simmonds Precision Products, Inc., Vergennes, VT (US)

(72) Inventors: William Durand, Edina, MN (US); Todd Anthony Ell, Savage, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 330 days.

(21) Appl. No.: 15/935,647

(22) Filed: Mar. 26, 2018

(65) Prior Publication Data

US 2019/0294182 A1 Sep. 26, 2019

(51) Int. Cl.
*G05D 1/10* (2006.01)
*F42B 10/26* (2006.01)
*F41G 7/22* (2006.01)
*F41G 7/00* (2006.01)
*F42B 30/10* (2006.01)

(52) U.S. Cl.
CPC .............. *G05D 1/107* (2013.01); *F41G 7/008* (2013.01); *F41G 7/222* (2013.01); *F41G 7/226* (2013.01); *F41G 7/2253* (2013.01); *F41G 7/2293* (2013.01); *F42B 10/26* (2013.01); *F42B 30/10* (2013.01)

(58) Field of Classification Search
CPC ......... G05D 1/107; F41G 7/008; F41G 7/222; F41G 7/2253; F41G 7/226; F41G 7/2293; F42B 10/26
See application file for complete search history.

(56) References Cited

U.S. PATENT DOCUMENTS

| 4,537,370 A | 8/1985 | Pizzurro |
| 4,561,611 A | 12/1985 | Sinclair et al. |
| 4,690,351 A | 9/1987 | Beckerleg et al. |
| 5,669,581 A | 9/1997 | Ringer |
| (Continued) | | |

FOREIGN PATENT DOCUMENTS

| DE | 4443134 A1 | 6/1996 |
| EP | 0561163 A1 | 9/1993 |
| (Continued) | | |

OTHER PUBLICATIONS

Extended European Search Report dated Aug. 23, 2019, received for corresponding European Application No. 19164878.1.

*Primary Examiner* — Hussein Elchanti
(74) *Attorney, Agent, or Firm* — Kinney & Lange, P.A.

(57) ABSTRACT

Apparatus and associated methods relate to determining a course-correction signal for a spin-stabilized projectile based on a time sequence of images of a scene aligned with and obtained by a forward-looking imager coupled to the projectile. As the projectile rotates, the aligned scenes captured in the images obtained by the forward-looking imager are rotated. The rotation angle of each of the captured scenes corresponds to the spin angle of the projectile at the time of image exposure. Objects in the captured scenes will circle about a rotation center of the time-sequence images. The distances from a rotation center to the objects in the captured scenes, as well as the rotation angles of the captured scenes can be used to generate a course-correction signal so that the projectile can be guided to a target selected from the objects in the captured scene.

17 Claims, 6 Drawing Sheets

(56) References Cited

U.S. PATENT DOCUMENTS

| | | | | |
|---|---|---|---|---|
| 6,568,627 | B1* | 5/2003 | Jones | F41G 7/26 244/3.11 |
| 6,610,971 | B1* | 8/2003 | Crabtree | F41F 3/04 244/3.1 |
| 8,525,088 | B1* | 9/2013 | Ell | F41G 3/145 244/3.1 |
| 9,658,040 | B1 | 5/2017 | Vasudevan et al. | |
| 2006/0049300 | A1* | 3/2006 | Dubois | F41G 7/26 244/3.13 |
| 2011/0084161 | A1* | 4/2011 | Wallis | F41G 7/30 244/3.13 |
| 2013/0248647 | A1* | 9/2013 | Ell | F41G 7/2226 244/3.17 |
| 2016/0195878 | A1* | 7/2016 | Peleg | F41G 7/007 244/3.11 |
| 2017/0307334 | A1* | 10/2017 | Greenwood | F42B 10/14 |

FOREIGN PATENT DOCUMENTS

| | | | |
|---|---|---|---|
| WO | 9928759 | A1 | 6/1999 |
| WO | 2010068320 | A2 | 6/2010 |

* cited by examiner

IMAGING SEEKER FOR A SPIN-STABILIZED PROJECTILE

BACKGROUND

Allied defense organizations can maintain large stockpiles of artillery gun-launched, gyroscopically spin-stabilized projectiles for indirect fire missions. When launched, these artillery rounds follow ballistic trajectories in flight. The accuracy in striking targets of such spin-stabilized projectiles can be limited by several factors. These factors can include gun launch errors, such as pointing and muzzle velocity errors. Poor estimations of wind and ambient temperature can also cause targeting errors. Such targeting errors can result in substantial miss distances from intended impact points. Targeting errors are frequently expressed as Circular Error Probable (CEP). For example, if fifty percent of projectiles strike within 200 meters of a target, such accuracy would be indicated as 200 meters CEP 50. In practice, this means that up to half the projectiles fired will impact more than 200 meters from the intended impact point (for CEP 50). Such high percentage of target misses is not uncommon and can substantially degrade the ability of the gun crew to defeat targets in a timely manner with the fewest rounds possible. The extra time required to fire the rounds required to hit and/or destroy an intended target can expose the gun crew to hostile counter fire and can require a deep supply chain to provide the quantities of projectiles needed.

Unguided artillery rounds often incorporate a fuzing device to achieve desired terminal effects. One such device is the M782 Multi-Option Fuze for Artillery (MOFA). It is approximately 5.9 inches in length, with 2.4 inches diameter and has a total weight of 1.7 pounds. A small internal battery provides in-flight power. At the tip is a forward looking RF transceiver that measures proximity distances over normal terrain. The fuze can function reliably over a wide range of demanding conditions and military environments, including 30,000 Gs of gun launch shock and 30,000 rpm angular spin rates. Such a fuze can be initialized through transfer of data prior to gun launch.

Despite the design challenges, some conventional fuzes have been modified, adding course-correcting capabilities so as to improve first round accuracies. After gun launch, such course-correcting fuzes can deploy aerodynamic control surfaces, which may induce drag, pitch, or yaw accelerations, thereby providing trajectory corrections in flight. These devices often include a guidance, navigation and control (GNC) capability for autonomous closed loop trajectory corrections. Autonomy is preferred over commanded control from the ground since autonomous control can permit effective "fire and forget" operation by the crew and can avoid detection via radio frequency (RF) emissions that can be intercepted by hostile forces.

Onboard GNC systems that provide autonomous control can function with inputs from a Global Positioning System Receiver (GPSR). The GPSR can provide continuous position, velocity and/or time data for GNC use. Accuracy of autonomous control by such GNC configured course-correcting fuzes can be limited by errors inherent to the GPS system as well as the errors in locating and specifying precise target locations. Course-correcting fuzes with internal GPSR have reduced artillery accuracy for some projectiles to below fifty meters CEP 50. Although this represents an improvement over uncorrected projectiles, it still can be an unacceptably large miss distance for many target engagements. Furthermore, GPS degradation can be induced by enemy actions, such as jamming, etc. If GPS availability is circumvented in such a manner, then the course-correcting fuze will have decreased effectiveness and accuracies may be even worse than the accuracies of rounds having no course-correction capabilities.

SUMMARY

Apparatus and associated methods relate to an imaging seeker for a spin-stabilized projectile. The imaging seeker includes a forward-looking imager configured to obtain a time-sequence of images of a scene aligned along an optical axis of the forward-looking imager. Each of the time-sequence of images is obtained at a capture time and has an image-rotation angle corresponding to a spin angle of the projectile at the capture time. The imaging seeker includes an image processor configured, for each of the time-sequence of images, to identify a target captured therein. The image process is further configured to determine relative position of the identified target with respect to rotation-center pixel coordinates. The imaging seeker also includes a signal generator configured to generate, based at least in part on the determined relative position of the identified target with respect to the rotation-center pixel coordinates, a course-correction signal configured to cause the projectile to correct course toward the target.

Some embodiments relate to a method for generating a course-correction signal for a spin-stabilized projectile. The method includes receiving a first image that is obtained at a first capture time. The first image has a first image-rotation angle. Then, a second image that is obtained at a second capture time subsequent to the first capture time is received. The second image has a second image-rotation angle. Then, a target captured within both the first and second images is identified. Then, relative position of the identified target with respect to rotation-center pixel coordinates for each of the first and second images is determined. Then, a course-correction signal is calculated based at least in part on the determined relative position of the identified target with respect to the rotation-center pixel coordinates.

Some embodiments relate to a system that includes a forward-looking imager disposed on a projectile, a guidance, navigation and control unit (GNC) disposed on the projectile, one or more processors, and computer-readable memory. The computer-readable memory is encoded with instructions that, when executed by the one or more processors, cause the system to receive a first image that is obtained at a first capture time. The first image has a first image-rotation angle. The computer-readable memory is further encoded with instructions that, when executed by the one or more processors, cause the system to receive a second image that is obtained at a second capture time subsequent to the first capture time. The second image has a second image-rotation angle. The computer-readable memory is further encoded with instructions that, when executed by the one or more processors, cause the system to identify a target captured within both the first and second images. The computer-readable memory is further encoded with instructions that, when executed by the one or more processors, cause the system to determine, for the identified target, relative position of the identified target with respect to rotation-center pixel coordinates for each of the first and second images. The computer-readable memory is further encoded with instructions that, when executed by the one or more processors, cause the system to generate a course-correction signal based at least in part on the determined relative position of the identified target with respect to the rotation-center pixel coordinates.

DETAILED DESCRIPTION

Apparatus and associated methods relate to determining a course-correction signal for a spin-stabilized projectile based on a time sequence of images of a scene aligned with and obtained by a forward-looking imager coupled to the projectile. As the projectile rotates, the aligned scenes captured in the images obtained by the forward-looking imager are rotated. The rotation angle of each of the captured scenes corresponds to the spin angle of the projectile at the time of image exposure. Objects in the captured scenes will circle about a rotation center of the time-sequence images. The distances from a rotation center to the objects in the captured scenes, as well as the rotation angles of the captured scenes can be used to generate a course-correction signal so that the projectile can be guided to a target selected from the objects in the captured scene.

Figure 1:
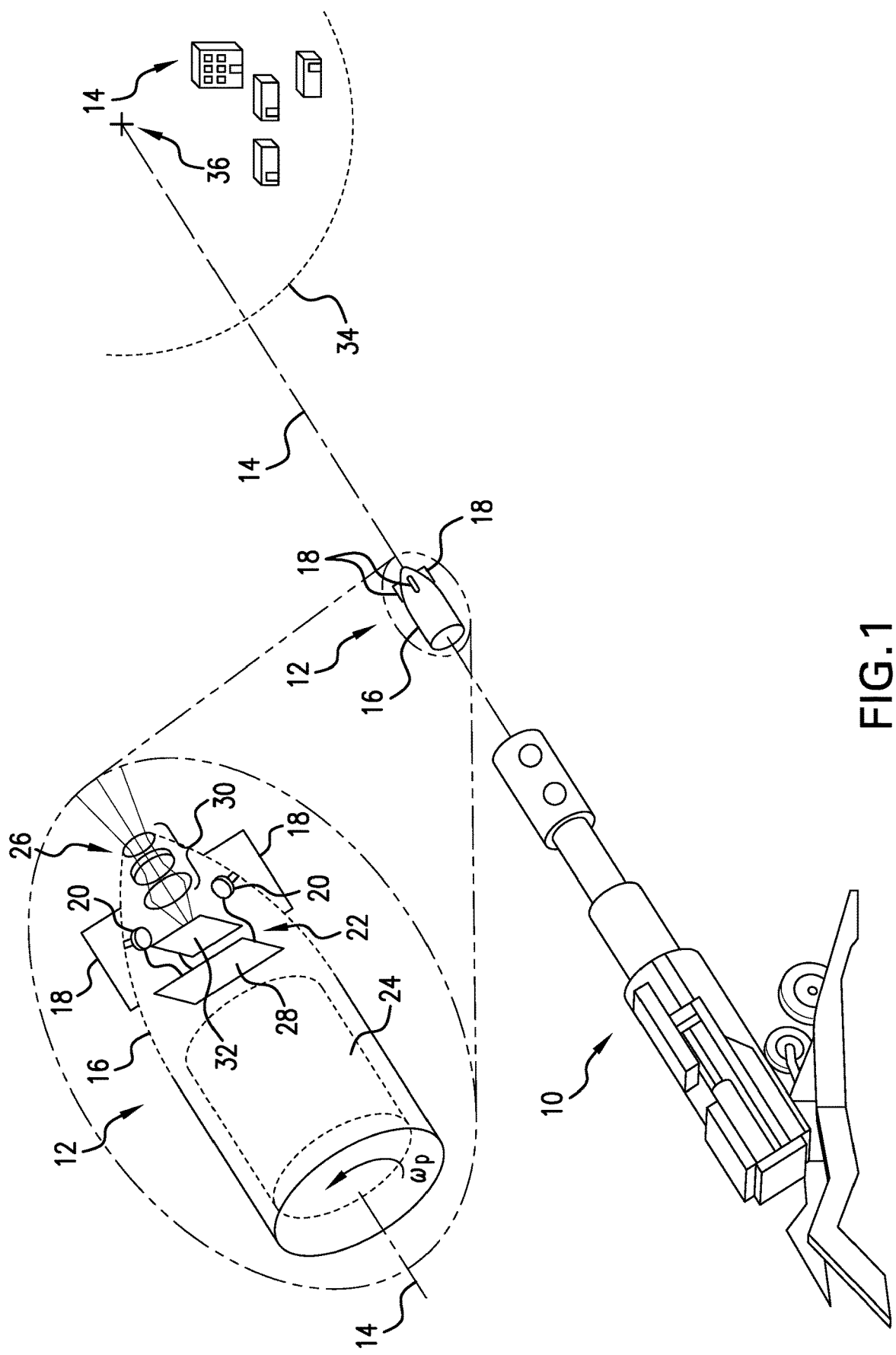
FIG. 1 is a schematic diagram of an exemplary scenario in which an imaging seeker guides a projectile to a target.

FIG. 1 is a schematic diagram of an exemplary scenario in which an imaging seeker guides a projectile to a target. In FIG. 1, rifled cannon 10 has launched spin-stabilized projectile 12 toward target 14. Because rifled cannon 10 is rifled, spin-stabilized projectile 12 is rotating about longitudinal axis 14 at rotational frequency Wp. Spin-stabilized projectile 12 includes airframe 16, flight control members 18, flight control transducers 20, imaging seeker 22, and explosive charge 24, all of which also are rotating at rotational frequency Wp of spin-stabilized projectile 12.

Imaging seeker 22 includes forward-looking imager 26 and controller 28. Forward-looking imager 26 includes optical lens stack 30 and focal plane array 32. Forward-looking imager 26 is configured to obtain a time-sequence of images of scene 34 aligned along longitudinal axis 14. Scene 34 will intercept longitudinal axis 14 at rotation-center scene location 36. Controller 28 is configured to receive the time-sequence of images from forward-looking imager 26 and to identify a portion of each of the time-sequence of images that corresponds to target 14. In the FIG. 1 depiction, each of the time-sequence of images is a passive image of the scene. Such passive images are indicative of the scene as illuminated by natural light sources.

Because forward-looking imager 26 is rotating about longitudinal axis 14, each successive image of the time-sequence of images obtained by forward-looking imager 26 is rotated from the previous images of the time-sequence of images. The amount of image rotation between successive images of the time-sequence of images can be determined by the rotational frequency $\omega_p$ of the spin-stabilized projectile and the time difference between image exposures of the successive images. Longitudinal axis 14 will intercept the scene at rotation-center scene location 36.

The pixel coordinates at which rotation-center scene location 36 is imaged are called rotation-center pixel coordinates. In some embodiments, longitudinal axis 14 is precisely collinear with an optical axis of forward-looking imager 26. In such embodiments, rotation-center scene location 36 will be imaged at the same pixel coordinates independent of the spin orientation of spin-stabilized projectile 12 at the image capture time. As spin-stabilized projectile 12 spins, image rotation will be about such spin-invariant rotation-center pixel coordinates.

In embodiments in which longitudinal axis 14 is not precisely collinear with the optical axis, however, rotation-center scene location 36 is imaged at different pixel coordinates traversing a circular locus of pixel coordinates. Thus, rotation-center pixel coordinates will be the coordinates along such a circular locus corresponding to the specific spin angle of spin-stabilized projectile 12 at the image capture time. Such a circular locus can be determined based on the time sequence of images. For example, each of the time sequence of images can be registered one to another, so as to determine image-rotation angle and rotation-center pixel coordinates for each of the time sequence of images (thereby determining the circular locus where rotation-center scene location 36 is imaged). Such image registration can employ image warping and/or transformation techniques such as, for example, image rotations and/or affine transformations.

The image-rotation angles and rotation-center pixel coordinates obtained from such image registration techniques can then be used in various manners. For example, in some embodiments, the image-rotation angles can be used to control the time of exposure such that future images obtained by forward-looking imager 26 will be oriented substantially the same as past images. For example, a time sequence of images can be obtained with capture times that correspond to a common angle or phase of spin orientation. In some embodiments, an image can be obtained at the same angle or phase of rotation. In other embodiments, images can be obtained at integral multiples of spin periods or rotations. Image registration of adjacent images can be performed so as to maintain common-phase exposure control of the time-sequence of images. In various embodiments, the capture time is controlled so that each of one or more images has an image-rotation angle within 2, 3, 5, 10, 12, or 15 degrees of the image-rotation angles of the others of the one or more images, for example.

In some embodiments, the images can be obtained at relative time intervals that are independent of a spin rate of spin-stabilized projectile 12. Such images will have various image-rotation angles. Image processing algorithms can be used to extract the information from these rotated images that is used for generating a course-correction signal. For example, image registration can be performed on various pairs of images of the time-sequence of images obtained by forward-looking imager 26. An image-rotation angle can be determined for each image of the time-sequence of images. Rotation-center pixel coordinates and/or a circular locus of pixel coordinates corresponding to the imaged location of longitudinal axis 14 can be determined from the image registration process. Then, an imaged target's relative position from the rotation-center pixel coordinates can be calculated. A course correction factor can be determined based on the imaged target's relative position with respect to the rotation-center pixel coordinates. A signal representing the determined course correction value can be generated and provided to a guidance, navigation, and control system for projectile 12.

In some embodiments, various time delays can arise between a time that an image is obtained and a time that the actual course correction of projectile 12 is realized. For example, in some embodiments, a time delay can be caused, at least in part, by a response time of flight control surface 18 to a signal sent to flight control transducer 20. Because during such a time delay, projectile 12 continues to spin, if the time delay is not considered in calculating course correction, a rotational error of the course correction of projectile 12 can result.

In some embodiments, controller 28 can learn of the time delays so as to provide course-correction signals that have low rotational error. For example, a first course-correction signal can be generated assuming a nominal value of time delay. After the first course correction is applied to projectile 12, forward-looking imager continues obtaining images. Such images would reflect a new orientation of longitudinal axis 14, which could be determined by determining the location of rotation-center pixel coordinates or the circular locus of pixels corresponding to longitudinal axis 14. A rotational error can be determined by comparing the determined rotation-center pixel coordinates and/or circular locus of pixels corresponding to longitudinal axis 14 with a predetermined predicted location of such pixel coordinates and/or with a pre-correction location of such metrics. Finally a revised time delay can be computed based on the rotational error determined.

Figure 2:
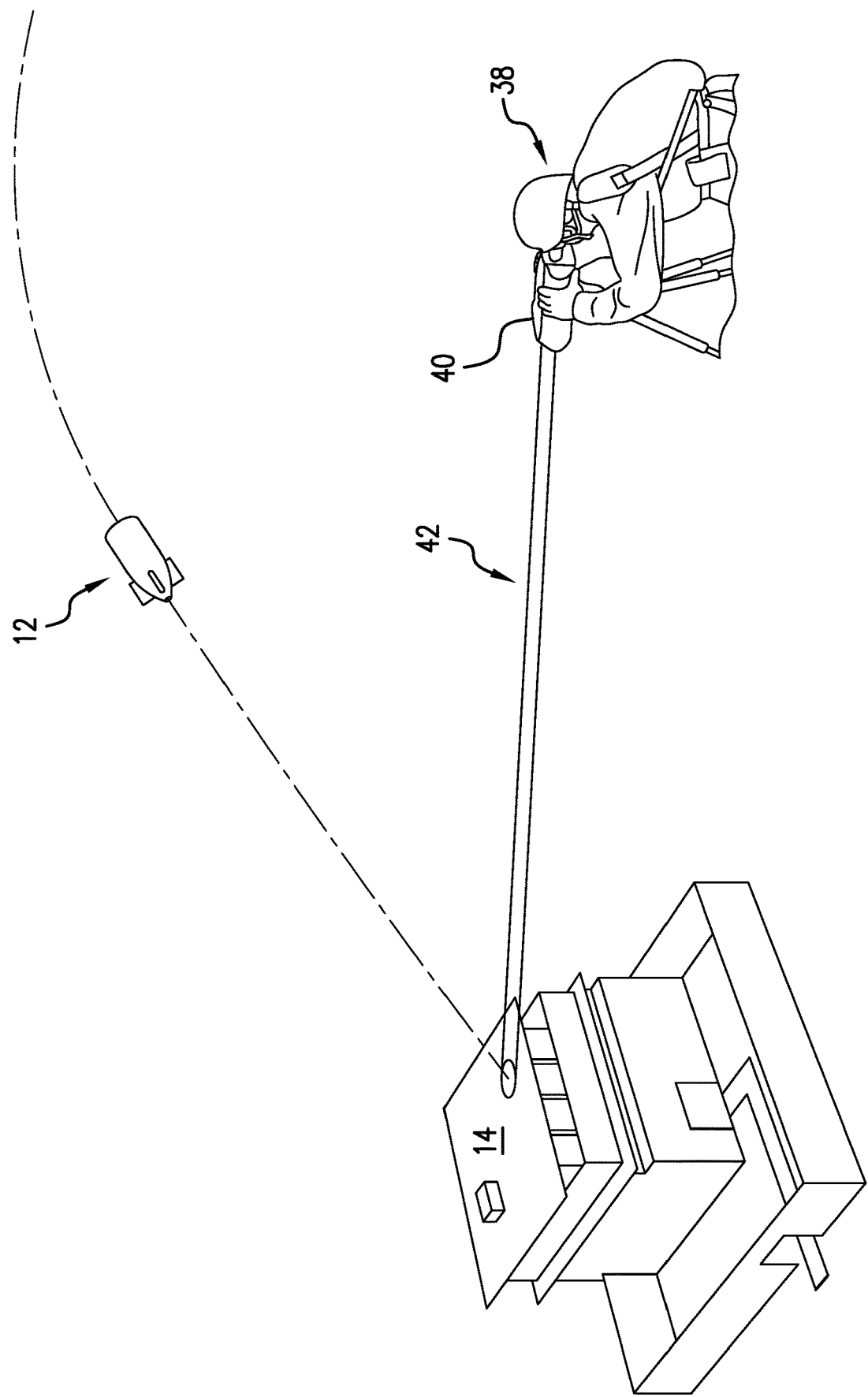
FIG. 2 is a schematic diagram of an exemplary scenario in which an imaging seeker guides a projectile to a target designated by a semi-active laser target designator.

FIG. 2 is a schematic diagram of an exemplary scenario in which an imaging seeker guides a projectile to a target designated by a semi-active laser target designator. In FIG. 2, forward observer 38 is "painting" or illuminating a desired target—designated target 14—using laser target designator (LTD) 40 to provide a target illuminating signal—laser radiation 42—that can be perceived and/or received by image seeker 22 (depicted in FIG. 1) of spin-stabilized projectile 12. Spin stabilized projectile 12 can be launched, for example, from ground, sea, or air. Spin-stabilized projectile 12 has imaging seeker 22 (depicted in FIG. 1), which provides a course-correction signal to a guidance navigation and control unit so as to guide spin stabilized projectile 12 to a location from which laser radiation 42 reflects (or to a location having a predetermined relation to the illuminated location). Imaging seeker 22 has Semi-Active Laser (SAL) imaging capabilities. In some embodiments, imaging seeker 22 can also have passive image seeking capabilities, such as those described above with reference to FIG. 1. In such embodiments, imaging seeker 22 can be called a dual-mode seeker, having both SAL imaging and passive-imaging capabilities.

SAL imaging and passive imaging operate using different technologies. With SAL imaging, the scene is artificially illuminated or painted by laser radiation 42 directed from laser target designator 40. Laser radiation 42 reflected from designated target 14 is received and processed to provide guidance commands to spin-stabilized projectile 12. Laser radiation 42 can be generated and transmitted from laser target designator 40 manned by forward observer 38, for example. Forward observer 38 directs laser radiation 42 to designated target 14, thereby designating target 14. Imaging seeker 22 of spin-stabilized projectile 12, which is remotely located from both designated target 14 and laser target designator 40, can then detect laser radiation 42 reflected from designated target 14. Imaging seeker 22 can include processing electronics for generating course-correction or guidance commands to spin-stabilized projectile 12. Such course-correction or guidance commands may use a targeting direction derived from an image location of laser radiation 42 reflected from designated target 14 and imaged by imaging seeker 22. Imaging seeker 22 can be used to identify designated target 14 and/or to guide spin-stabilized projectile 12 to designated target 14. To achieve a precise hit on designated target 14, forward observer 38 can designate designated target 14 until spin-stabilized projectile 12 impacts designated target 14.

If, however, imaging seeker 22 also has passive-imaging capabilities, imaging seeker 22 can rely on automatic target tracking algorithms that distinguish an image of designated target 14 from background clutter under ambient lighting conditions. Passive image capabilities do not require active designation by forward observer 38. Acquiring designated target 14 using passive image capabilities can be difficult in certain situations, though. Passive image capabilities can have difficulties, for example, in certain weather conditions and/or when imaging seeker 22 is at great distances from designated target 14, as designated target 14 may be imaged onto one or few pixels of a focal plane array at such great distances.

Passive-imaging capabilities can use sophisticated Automatic Target Acquisition/Recognition (ATA/ATR) algorithms that require demanding processing resources. Being able to both actively designate and to passively track designated target 14 can eliminate the need for forward observer 38 to designate designated target 14 throughout the entire flight of spin-stabilized projectile 12 till impact. Some examples of such dual-mode capabilities are disclosed by Ell in U.S. patent application Ser. No. 15/269,601, filed Sep. 19, 2016, titled "Seeker/Designator Handoff System for Use in Dual-Mode Guided Missiles," the entire disclosure of which is hereby incorporated by reference. Artificial intelligence routines that recognize designated target 14 from images can provide course-correction information for spin-stabilized projectile 12 as it nears designated target 14. Moreover, when imaging seeker 22 is passively tracking designated target 14, any rapid changes in illumination, as could be caused by laser radiation 42 from active laser target designator 40, can cause difficulties in target recognition.

In order to switch from using semi-active SAL-imaging capabilities to passive-imaging capabilities for tracking of designated target 14, images of designated target 14 for SAL seeking and passive-image seeking can be concurrently provided, even while laser target designator 40 is active. Imaging seeker 22 can have both SAL and passive-imaging capabilities so as to provide concurrent images for both SAL seeking and passive-image seeking.

SAL-imaging capabilities and passive-imaging capabilities can both be performed by some embodiments of forward-looking imager 26 (depicted in FIG. 1). Passive images and SAL images can both be used to locate designated target 14 and to guide spin-stabilized projectile 12 to designated target 14. In some embodiments, focal plane array 32 is sensitive to light having wavelengths corresponding to Short Wave InfraRed (SWIR) wavelengths for use in forming monochromatic images. In other embodiments, focal plane array 32 is sensitive to light having wavelengths corresponding to visible light wavelengths for use in forming multichromatic image and/or color images.

In embodiments in which forward-looking imager 26 has both SAL-imaging and passive-imaging capabilities, images obtained using SAL imaging can be different from images obtained using passive imaging. For example, SAL imaging can permit a high frame rate of image data. Such a high frame rate can be used to help determine the proper phasing of the image exposures so as to capture passive images in a controlled spin orientation, for example.

Because image data obtained using SAL imaging can be sampled at a high frequency, sophisticated image processing of such image data can be difficult due to processing requirements for such sophisticated image processing. In some embodiments, SAL imaging can be used to identify an image in which laser radiation is received by selecting an image that contains pixels with a response indicative of laser illumination. For example, a frame that has pixels indicative of a light intensity of greater than a predetermined threshold may correspond to a frame that receives laser radiation 42 generated by LTD 40 and reflected off designated target 14. To minimize conflation of laser radiation 42 with received light having wavelengths not within those of laser radiation 42, some embodiments will employ a narrow-band filter to obstruct wavelengths of received light energies that do not correspond to the wavelengths of laser radiation 42 generated by LTD 40. By using such a narrow-band filter, pixel data differences may be maximized between frames receiving laser radiation 42 from LTD 40 and frames when no such laser radiation 42 is received.

Figure 3C:
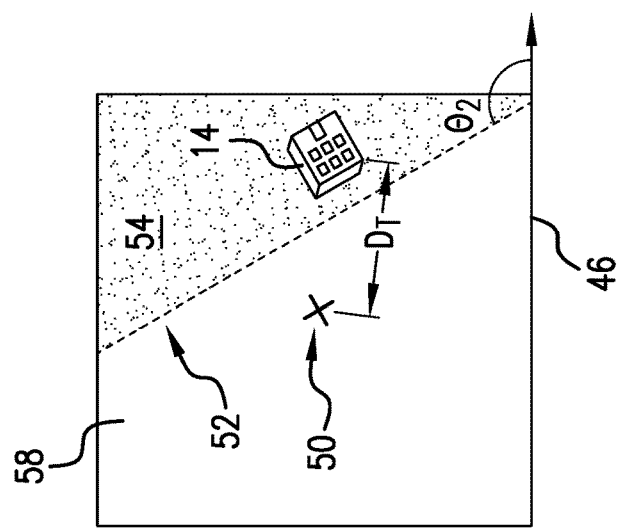
FIGS. 3A-3C are example images from a time-sequence of images obtained by an imaging seeker on board a spin-stabilized projectile.
Figure 3B:
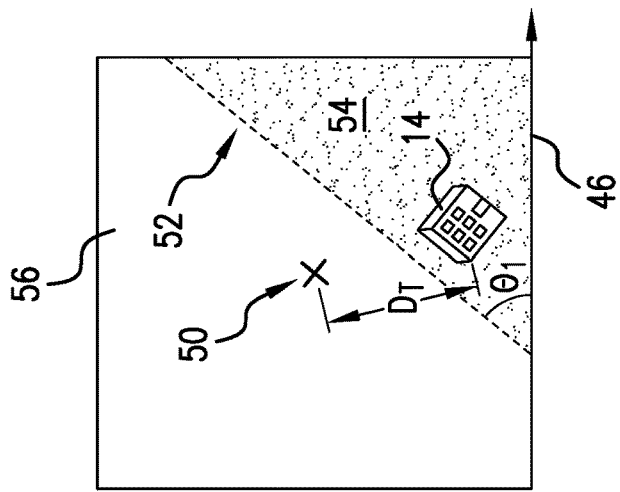
Figure 3A:
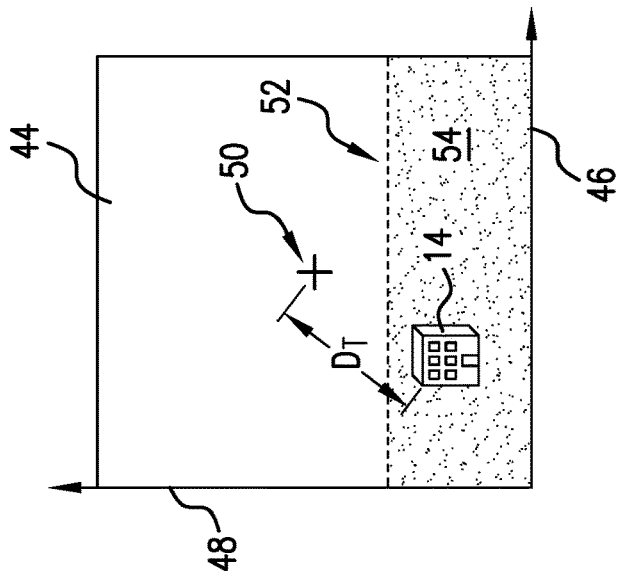

FIGS. 3A-3C are example images from a time-sequence of images obtained by an imaging seeker on board a spin-stabilized projectile. In FIG. 3A, first image 44 of a time-sequence of images is depicted. First image 44 has a rotation value of approximately zero degrees with respect to reference axis 46 of first image 44. Reference axis 46, in the depicted embodiment is the horizontal axis of first image 44. In some embodiments vertical axis 48 of first image 44 can be used as a reference axis. First image 44 has a zero degree rotation, because first image 44 was obtained at a time of exposure when focal plane array 32 had a rotation value such that reference axis 46 was parallel with a horizon reference of scene 34.

First image 44 includes target 14, image-rotation center 50 and range boundary 52 of guidable range 54 for spin-stabilized projectile 12 (depicted in FIGS. 1 and 2). Only objects located in pixel regions on the shaded side of range boundary 52 are within guidable range 54 for spin-stabilized projectile 12. Guidable range 54 does not include image-rotation center 50 because various phenomena, such as wind, drag and gravity, can cause spin-stabilized projectile 12 to have a trajectory that falls below longitudinal axis 14 (depicted in FIG. 1), which intercepts the scene at image-rotation center 50. Range boundary 52 can be determined based on various flight parameters and/or image features. For example, altitude and flight attitude (e.g., flight pitch) can be used to determine a distance to rotation-center scene location 36 (depicted in FIG. 1) corresponding to image-rotation center 50. In some embodiments, flight attitude data can be used with target distance $D_T$ of selected target 14 from image-rotation center 50 to determine an actual distance between selected target 14 and rotation-center scene location 36.

In some embodiments, an image processor will be configured to identify objects that are within guidable range 54 of the projectile. The image processor can then determine pixel coordinates corresponding to the identified objects. In some embodiments, the image processor can assign target priority weights to the identified objects within guidable range 54 of the spin-stabilized projectile 12. The image processor can then select a target based on the assigned target priority weights. The image processor, for example, might select, as target, the object assigned the greatest target priority weight.

Second image 56, depicted in FIG. 3B, shows the same scene aligned with longitudinal axis 14 as is depicted in FIG. 3A. Second image 56 is obtained a short time ΔT after first image 44 was obtained. Because spin-stabilized projectile 12, from which first image 44 and second image 56 were obtained, spins, second image 56 is rotated with respect to first image 44. Image-rotation angle $\theta_1$ of second image 56 can be determined in various manners. Image-rotation angle $\theta_1$ is depicted in FIG. 3B as the angle between range boundary 52 and reference axis 46. In some embodiments, flight data, such as flight attitude (e.g., flight roll) can be used to determine image-rotation angle $\theta_1$. Second image 56 includes selected target 14, which is rotated with respect to its appearance in first image 44 by image-rotation angle $\theta_1$.

The rotational rate Wp of spin-stabilized projectile 12 (depicted in FIG. 1) can be determined based on the ratio of the difference between the rotation angles of first and second images 44, 56 and the time difference ΔT of their capture:

$$\omega_P = \frac{\Delta \theta}{\Delta T} \quad (1)$$

The rotational rate $\omega_p$ of spin-stabilized projectile 12 then can be used to predict the rotation angle θ as a function of capture time $t_{frame}$. In some embodiments, such prediction can be used to control the capture times $t_{frame}$ such that the rotation angle θ of the images are within a predetermined threshold with respect to a reference axis, such as reference axis 46, for example.

Third image 58, depicted in FIG. 3C, shows the same scene aligned with longitudinal axis 14 as is depicted in FIGS. 3A and 3B. Third image 58 is obtained a short time ΔT after second image 56 was obtained. Because spin-stabilized projectile 12, from which first image 44, second image 56, and third image 58 were obtained, spins, third image 58 is rotated with respect to second image 56. Image-rotation angle $\theta_2$ is depicted in FIG. 3C as the angle between range boundary 52 and reference axis 46. Third image 58 includes selected target 14, which is rotated with respect to its appearance in first image 44.

Selected target 14 rotates about image-rotation center 50 with each successive image in the time sequence of images 44, 56 and 58. As spin-stabilized projectile 12 becomes nearer to selected target 14, selected target 14 also increases in size. As spin-stabilized projectile 12 approaches selected target 14, range boundary 52 will become nearer to image-rotation center 50. Thus, if course correction is efficacious, resulting in spin-stabilized projectile 12 acquiring selected target 14, the obtained images will depict selected target 14 getting ever larger and ever closer to image-rotation center 50. Thus, the time sequence of images should show selected target 14 spiraling inward toward and about image-rotation center 50. As selected target 14 is spiraling inward and about image-rotation center 50, selected target 14 will increase in size in the obtained images.

Figure 4:
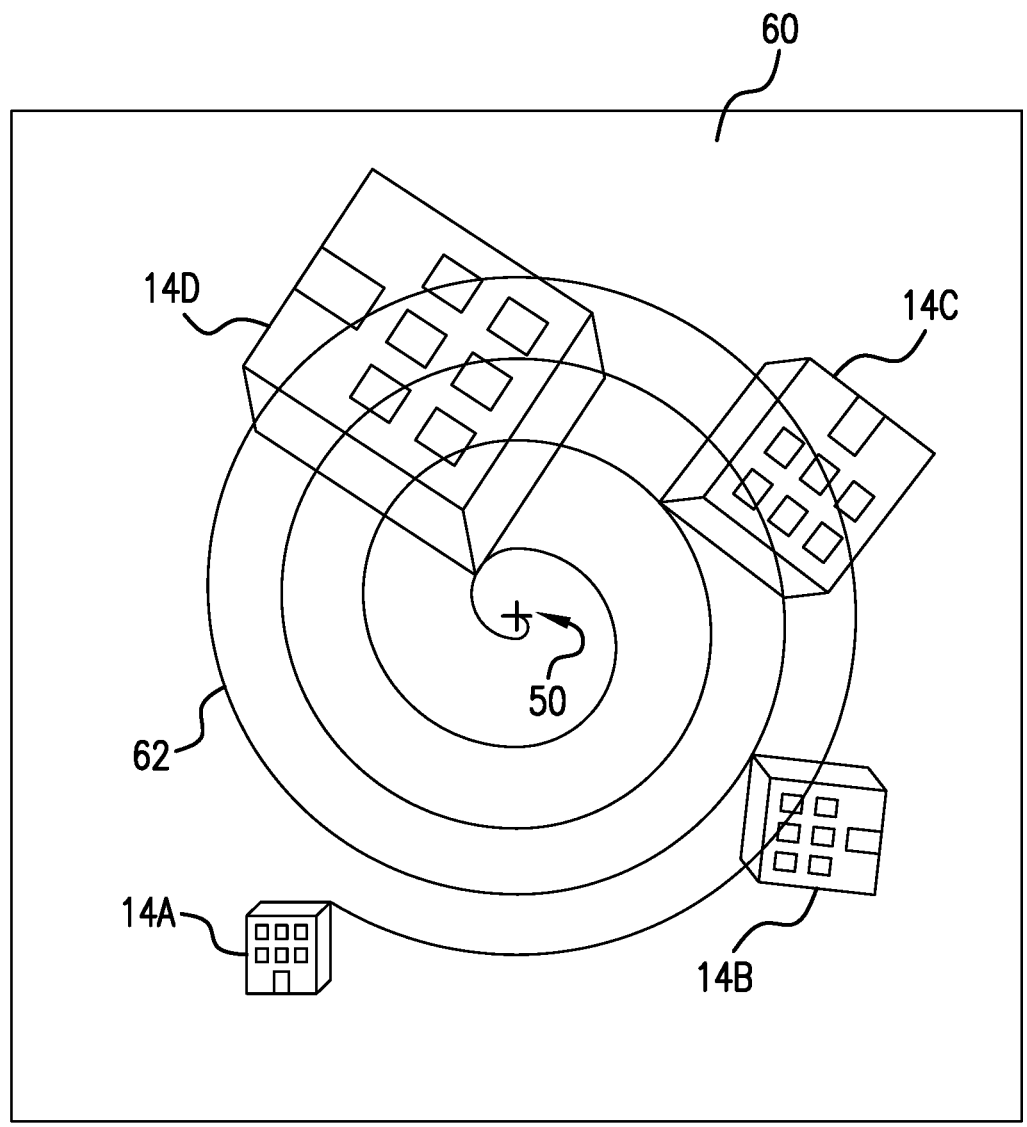
FIG. 4 is a composite image of the example images depicted in FIGS. 3A-3C obtained by an imaging seeker on board a spin-stabilized projectile.

FIG. 4 is a composite image of the example images depicted in FIGS. 3A-3C obtained by an imaging seeker on board a spin-stabilized projectile. Composite image 60, depicted in FIG. 4, is composed of four of a time-sequence of images obtained from spin-stabilized projectile 12 (depicted in FIG. 1). The four images superimposed in composite image 60 were obtained at four capture times, $T_1<T_2<T_3<T_4$ of the time-sequence. Composite image 60 depicts selected target 14A, 14B, 14C and 14D as it is imaged at the four capture times $T_1$, $T_2$, $T_3$ and $T_4$, respectively. Thus, target image 14A is obtained relatively late in flight, while target image 14D is obtained relatively late in flight. As such, target images 14A, 14B, 14C and 14D get progressively larger. Furthermore, target images 14A, 14B, 14C and 14D get progressively closer to image-rotation center 50 as a result of the course corrections provided for spin-stabilized projectile 12. Spiral path 62 is shown to indicate the image path taken for a feature (i.e., top right corner of the building selected as target 14) within the frame of composite image 60.

Figure 5:
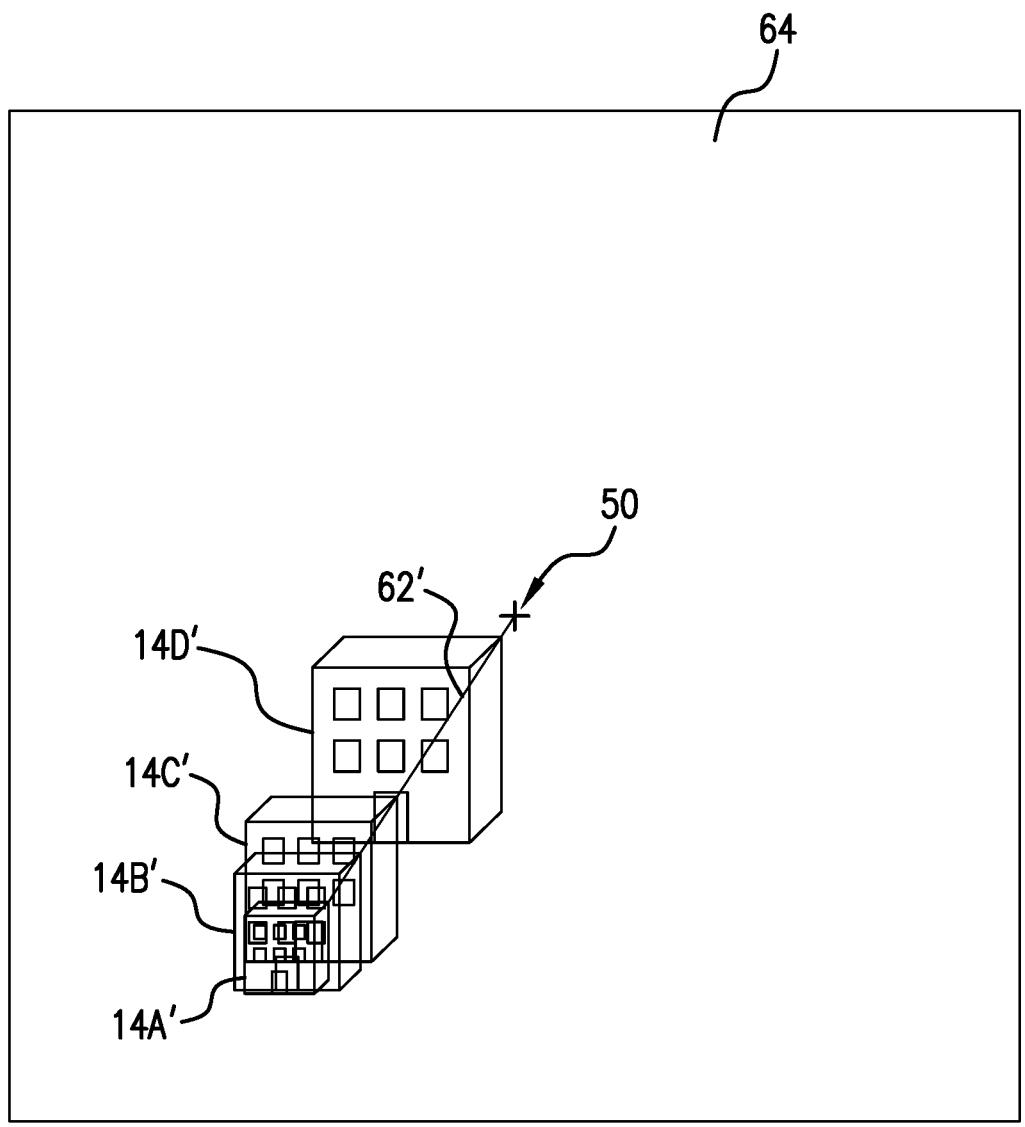
FIG. 5 is a graph of a composite image of the example images obtained at controlled times of exposure by an imaging seeker on board a spin-stabilized projectile.

FIG. 5 is a graph of a composite image of the example images obtained at controlled times of exposure by an imaging seeker on board a spin-stabilized projectile. Composite image 64, depicted in FIG. 5, is composed of four of a time-sequence of images obtained from spin-stabilized projectile 12 (depicted in FIG. 1). Composite image 64 is similar to composite image 60, depicted in FIG. 4, except that capture times have been controlled in composite image 64 so that the rotation angle θ of each of the four superimposed images are within a predetermined threshold of one another. The four images superimposed in composite image 60 were obtained at four capture times, $T_1'<T_2'<T_3'<T_4'$ of the time-sequence of images. Composite image 60 depicts selected target 14A', 14B', 14C' and 14D' as it is imaged at the four times $T_1'$, $T_2'$, $T_3'$ and $T_4'$, respectively. Thus, target image 14A' is obtained relatively early in flight, while target image 14D' is obtained relatively late in flight. As such, target images 14A', 14B', 14C' and 14D' get progressively larger. Furthermore, targets 14A', 14B', 14C' and 14D' get progressively closer to image-rotation center 50 as a result of the course corrections provided for spin-stabilized projectile 12. Spiral path 62' is shown to indicate the image path taken for a feature (i.e., top right corner of the building selected as target 14) within the frame of composite image 64.

Figure 6:
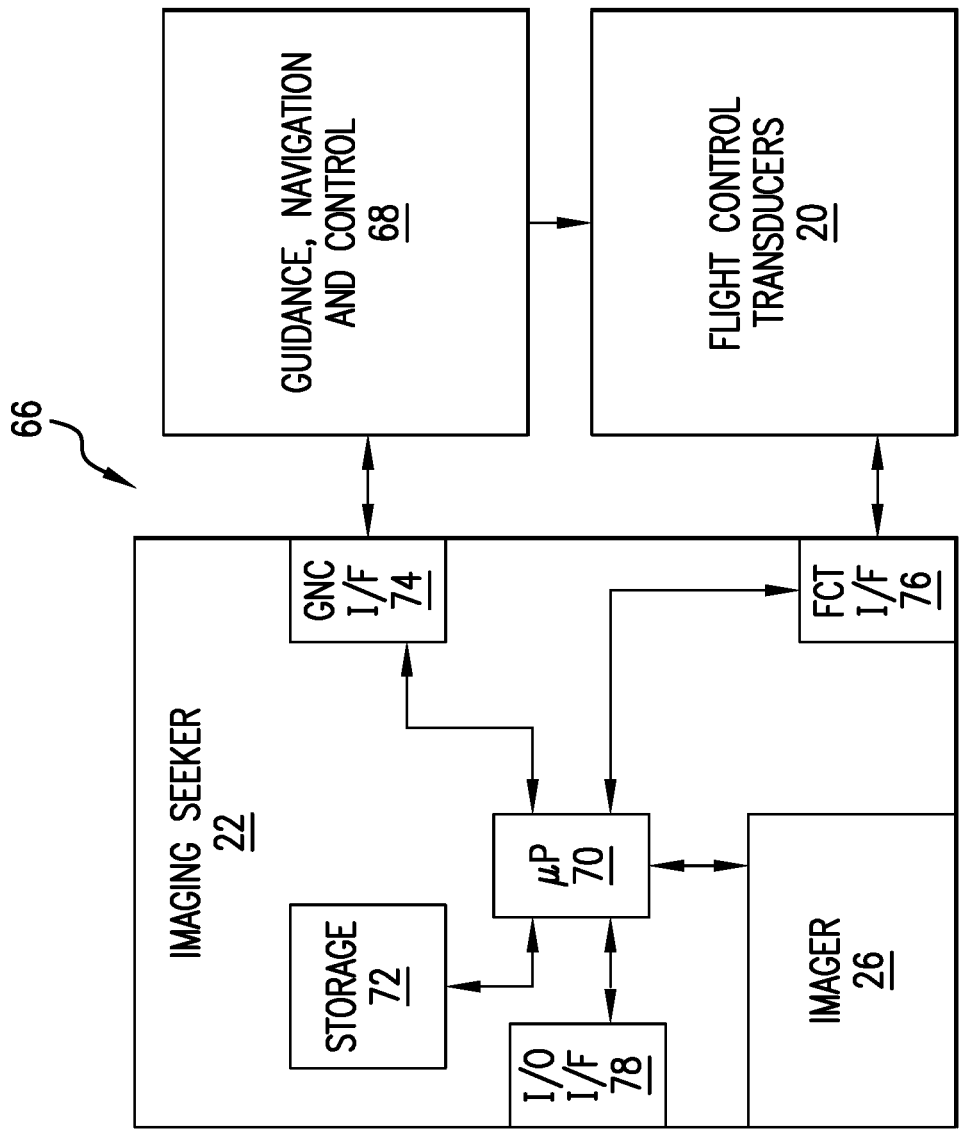
FIG. 6 is a block diagram of an exemplary system generating a course-correction signal for a spin-stabilized projectile.

FIG. 6 is a block diagram of an exemplary system generating a course-correction signal for a spin-stabilized projectile. In FIG. 6, guidance system 66 for spin-stabilized projectile 12 (depicted in FIG. 1) includes imaging seeker 22, guidance, navigation, and control unit (GNC) 68 and flight control transducer(s) (FCT) 20. Imaging seeker 22 interfaces with both GNC 68 and FCT(s) 20. In some embodiments, imaging seeker does not directly interface with FCT(s) 20, but instead indirectly interfaces with FCT(s) 20 via GNC 68. In some embodiments, GNC 68 provides flight telemetry and navigation information to imaging seeker 22. In various embodiments, imaging seeker 22 can include more or fewer components.

Imaging seeker 22 includes processor(s) 70, forward-looking imager 26, storage device(s) 72, GNC interface 74, FCT(s) interface 76, and input/output interface 78. Processor(s) 70 can receive program instructions from storage device(s) 72. Processor(s) 70 can be configured to generate course-correction signals for spin-stabilized projectile 12 based on received program instructions. For example, processor(s) 70 can be configured to receive, from forward-looking imager 26, a time sequence of images. Processor(s) 70 can perform image processing algorithms upon each of the time sequence of images, so as to select a target amongst objects captured within the time sequence of images, and to generate course-correction signals so as to direct spin-stabilized projectile to the selected target.

Processor(s) 70, in some embodiments, can be configured to implement functionality and/or process instructions for execution within imaging seeker 22. For instance, processor(s) 70 can be capable of processing instructions stored in storage device(s) 72. Examples of processor(s) 70 can include any one or more of a microprocessor, a controller, a digital signal processor(s) (DSP), an application specific integrated circuit (ASIC), a field-programmable gate array (FPGA), or other discrete or integrated logic circuitry having similar processing capabilities.

Storage device(s) 72 can be configured to store information within imaging seeker 22 during operation. Storage device(s) 72, in some examples, is described as computer-readable storage media. In some examples, a computer-readable storage media can include a non-transitory medium. The term "non-transitory" can indicate that the storage medium is not solely embodied in a carrier wave or a propagated signal. In certain examples, a non-transitory storage medium can store data that can, over time, change (e.g., in RAM or cache). In some examples, storage device(s) 72 is a temporary memory, meaning that a primary purpose of such storage device(s) 72 is not long-term storage. Storage device(s) 72, in some examples, is described as volatile memory, meaning that storage device(s) 72 do not maintain stored contents when power to imaging seeker 22 is turned off. Examples of volatile memories can include random access memories (RAM), dynamic random access memories (DRAM), static random access memories (SRAM), and other forms of volatile memories. In some examples, storage device(s) 72 is used to store program instructions for execution by processor(s) 70. Storage device(s) 72, in one example, is used by software or applications running on imaging seeker 22 (e.g., a software program implementing image processing algorithms) to temporarily store information during program execution.

Storage device(s) 72, in some examples, can also include one or more computer-readable storage media. Some storage device(s) 72 can be configured to store larger amounts of information than is sometimes stored in volatile memory. Storage device(s) 72 can further be configured for long-term storage of information. In some examples, storage device(s) 72 include non-volatile storage elements. Examples of such non-volatile storage elements can include magnetic hard discs, optical discs, flash memories, or forms of electrically programmable memories (EPROM) or electrically erasable and programmable (EEPROM) memories.

GNC interface 74 can be used to communicate information between imaging seeker 22 and GNC 68. In some embodiments, such information can include aircraft conditions, flying conditions, and/or atmospheric conditions. In some embodiments, such information can include data processed by imaging seeker 22, such as, for example, range data. GNC interface 74 can also include a communications module. GNC interface 74, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the GNC 68 can be performed via a communications bus, such as, for example, an Aeronautical Radio, Incorporated (ARINC) standard communications protocol. In an exemplary embodiment, communication with the GNC 68 can be performed via a communications bus, such as, for example, a Controller Area Network (CAN) bus.

FCT interface 76 can be used to communicate information between imaging seeker 22 and GNC 68. In some embodiments, such information can include command signals for flight control members and/or feedback signals indicative of actual position of flight control members. FCT interface 76 can also include a communications module. FCT interface 76, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with FNC(s) 20 can be performed via a communications bus, such as, for example, an Aeronautical Radio, Incorporated (ARINC) standard communications protocol. In an exemplary embodiment, aircraft communication with FNC(s) 20 can be performed via a communications bus, such as, for example, a Controller Area Network (CAN) bus.

Input/output interface 78, in some examples, is configured to receive input from a user. Input/output interface 78 can be used to acquire targeting information before spin-stabilized projectile 12 is launched, for example. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus. Input/output interface can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

Apparatus and associated methods relate to an imaging seeker for a spin-stabilized projectile. The imaging seeker includes a forward-looking imager configured to obtain a time-sequence of images of a scene aligned along an optical axis of the forward-looking imager. Each of the time-sequence of images is obtained at a capture time and has an image-rotation angle corresponding to a spin angle of the projectile at the capture time. The imaging seeker includes an image processor configured, for each of the time-sequence of images, to identify a target captured therein. The image process is further configured to determine relative position of the identified target with respect to rotation-center pixel coordinates. The imaging seeker also includes a signal generator configured to generate, based at least in part on the determined relative position of the identified target with respect to the rotation-center pixel coordinates, a course-correction signal configured to cause the projectile to correct course toward the target.

The system of the preceding paragraph can optionally include, additionally and/or alternatively, any one or more of the following features, configurations and/or additional components:

A further embodiment of the foregoing system can further include a controller configured to control, based on an image-rotation angle(s) of an earlier image(s) of the time sequence of images, the capture time corresponding to a later image of the time-sequence of images so as to control the image-rotation angle of the later image of the time sequence of images.

A further embodiment of any of the foregoing systems, wherein the controller can be further configured to control the capture time corresponding to the later image of a time-sequence of images such that a difference between the imager-rotation angle of the later image of the time-sequence of images and the image-rotation angle of an earlier image(s) of the time-sequence of images is less than 15 degrees.

A further embodiment of any of the foregoing systems, wherein the image processor can be further configured to determine whether the identified target is within a guidable range of the projectile.

A further embodiment of any of the foregoing systems, wherein the image processor can be further configured to identify objects that are within a guidable range of the projectile, and to determine pixel coordinates corresponding to the identified objects.

A further embodiment of any of the foregoing systems, wherein the image processor can be further configured to assign target priority weights to the identified objects within the guidable range of the projectile.

A further embodiment of any of the foregoing systems, wherein the image processor can select the target based on the assigned target priority weights.

A further embodiment of any of the foregoing systems, wherein the selected target can correspond to the object assigned with the greatest target priority weight.

Some embodiments relate to a method for generating a course-correction signal for a spin-stabilized projectile. The method includes receiving a first image that is obtained at a first capture time. The first image has a first image-rotation angle. Then, a second image that is obtained at a second capture time subsequent to the first capture time is received. The second image has a second image-rotation angle. Then, a target captured within both the first and second images is identified. Then, relative position of the identified target with respect to rotation-center pixel coordinates for each of the first and second images is determined. Then, a course-correction signal is calculated based at least in part on the determined relative position of the identified target with respect to the rotation-center pixel coordinates.

The method of the preceding paragraph can optionally include, additionally and/or alternatively, any one or more of the following features, configurations and/or additional components:

A further embodiment of the foregoing method can further include controlling, based on the first capture time and the first image-rotation angle, the second capture time so as to control the second image-rotation angle.

A further embodiment of any of the foregoing methods can further include controlling the second capture time such that a difference between the first image-rotation angle and the second image-rotation angle is less than 15 degrees.

A further embodiment of any of the foregoing methods can further include determining whether the identified target is within a guidable range of the projectile.

A further embodiment of any of the foregoing methods can further include identifying image features that are common to both the first and second images. The method can also include selecting the target from the identified common image features.

A further embodiment of any of the foregoing methods can further include determining whether each of the identified common image features are within a guidable range of the projectile.

A further embodiment of any of the foregoing methods can further include assigning target priority weights to the common image features determined to be within the guidable range of the projectile. The method can also include selecting the selecting the object assigned with the greatest target priority weight as the target.

Some embodiments relate to a system that includes a forward-looking imager disposed on a projectile, a guidance, navigation and control unit (GNC) disposed on the projectile, one or more processors, and computer-readable memory. The computer-readable memory is encoded with instructions that, when executed by the one or more processors, cause the system to receive a first image that is obtained at a first capture time. The first image has a first image-rotation angle. The computer-readable memory is further encoded with instructions that, when executed by the one or more processors, cause the system to receive a second image that is obtained at a second capture time subsequent to the first capture time. The second image has a second image-rotation angle. The computer-readable memory is further encoded with instructions that, when executed by the one or more processors, cause the system to identify a target captured within both the first and second images. The computer-readable memory is further encoded with instructions that, when executed by the one or more processors, cause the system to determine, for the identified target, relative position of the identified target with respect to rotation-center pixel coordinates for each of the first and second images. The computer-readable memory is further encoded with instructions that, when executed by the one or more processors, cause the system to generate a course-correction signal based at least in part on the determined relative position of the identified target with respect to the rotation-center pixel coordinates.

The system of the preceding paragraph can optionally include, additionally and/or alternatively, any one or more of the following features, configurations and/or additional components:

A further embodiment of the foregoing system, wherein the computer-readable memory can be further encoded with instructions that, when executed by the one or more processors, cause the system to control, based on the first capture time and the first image-rotation angle, the second capture time so as to control the second image-rotation angle.

A further embodiment of any of the foregoing system, wherein the computer-readable memory can be further encoded with instructions that, when executed by the one or more processors, cause the system to determine whether the identified target is within a guidable range of the projectile.

A further embodiment of any of the foregoing system, wherein the computer-readable memory can be further encoded with instructions that, when executed by the one or more processors, cause the system to identify image features that are common to both the first and second images. The computer-readable memory can also be encoded with instructions that cause the system to select the target from the identified common image features.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An imaging seeker for a spin-stabilized projectile, the imaging seeker comprising:
    a forward-looking imager configured to obtain a time-sequence of images of a scene aligned along an optical axis of the forward-looking imager, wherein each of the time-sequence of images is obtained at a capture time and has an image-rotation angle corresponding to a spin angle of the projectile at the capture time;
    an image processor configured, for each of the time-sequence of images, to identify a target captured therein, and to determine relative position of the identified target with respect to rotation-center pixel coordinates, the relative position including an image rotation angle;
    a signal generator configured to generate, based at least in part on the determined relative position of the identified target with respect to the rotation-center pixel coordinates, a course-correction signal configured to cause the projectile to correct course toward the target; and
    a controller configured to control, based on the image-rotation angle(s) of an earlier image(s) of the time sequence of images, the capture time corresponding to a later image of the time-sequence of images so as to control the image-rotation angle of the later image of the time sequence of images.

2. The imaging seeker of claim 1, wherein the controller is further configured to control the capture time corresponding to the later image of a time-sequence of images such that a difference between the imager-rotation angle of the later image of the time-sequence of images and the image-rotation angle of an earlier image(s) of the time-sequence of images is less than 15 degrees.

3. The imaging seeker of claim 1, wherein the image processor is further configured to determine whether the identified target is within a guidable range of the projectile.

4. The imaging seeker of claim 1, wherein the image processor is further configured to identify objects that are within a guidable range of the projectile, and to determine pixel coordinates corresponding to the identified objects.

5. The imaging seeker of claim 4, wherein the image processor is further configured to assign target priority weights to the identified objects within the guidable range of the projectile.

6. The imaging seeker of claim 5, wherein the image processor selects the target based on the assigned target priority weights.

7. The imaging seeker of claim 6, wherein the selected target corresponds to the object assigned with the greatest target priority weight.

8. A method for generating a course-correction signal for a spin-stabilized projectile, the method comprising:
    receiving a first image that is obtained at a first capture time, wherein the first image has a first image-rotation angle;

receiving a second image that is obtained at a second capture time subsequent to the first capture time, wherein the second image has a second image-rotation angle;

identifying a target captured within both the first and second images;

determining, for the identified target, relative position of the identified target with respect to rotation-center pixel coordinates for each of the first and second images, the relative position including the first and second image rotation angles, respectively;

generating a course-correction signal based at least in part on the determined relative position of the identified target with respect to the rotation-center pixel coordinates; and controlling, based on the first capture time and the first image-rotation angle, the second capture time so as to control the second image-rotation angle.

9. The method of claim 8, further comprising:
controlling the second capture time such that a difference between the first image-rotation angle and the second image-rotation angle is less than 15 degrees.

10. The method of claim 8, further comprising:
determining whether the identified target is within a guidable range of the projectile.

11. The method of claim 8, further comprising:
identifying image features that are common to both the first and second images; and
selecting the target from the identified common image features.

12. The method of claim 10, further comprising:
determining whether each of the identified common image features are within a guidable range of the projectile.

13. The method of claim 12, further comprising:
assigning target priority weights to the common image features determined to be within the guidable range of the projectile; and
selecting the object assigned with the greatest target priority weight as the target.

14. A system comprising:
a forward-looking imager disposed on a projectile;
a guidance, navigation and control unit (GNC) disposed on the projectile;
one or more processors; and
computer-readable memory encoded with instructions that, when executed by the one or more processors, cause the system to:
receive a first image that is obtained at a first capture time, wherein the first image has a first image-rotation angle;
receive a second image that is obtained at a second capture time subsequent to the first capture time, wherein the second image has a second image-rotation angle;
identify a target captured within both the first and second images;
determine, for the identified target, relative position, including the first and second image rotation angles, of the identified target with respect to rotation-center pixel coordinates for each of the first and second images, respectively;
generate a course-correction signal based at least in part on the determined relative position of the identified target with respect to the rotation-center pixel coordinates; and
control, based on the first capture time and the first image-rotation angle, the second capture time so as to control the second image-rotation angle.

15. The system of claim 14, wherein the computer-readable memory encoded with instructions that, when executed by the one or more processors, cause the system to:
determine whether the identified target is within a guidable range of the projectile.

16. The system of claim 14, wherein the computer-readable memory encoded with instructions that, when executed by the one or more processors, cause the system to:
identify image features that are common to both the first and second images; and
select the target from the identified common image features.

17. The system of claim 14, wherein the computer-readable memory encoded with instructions that, when executed by the one or more processors, cause the system to:
assign target priority weights to the common image features determined to be within the guidable range of the projectile; and
select the selecting the object assigned with the greatest target priority weight as the target.

* * * * *